No. 25,200. PATENTED AUG. 23, 1859.
C. H. HUNTER.
MACHINE FOR WEIGHING GRAIN.
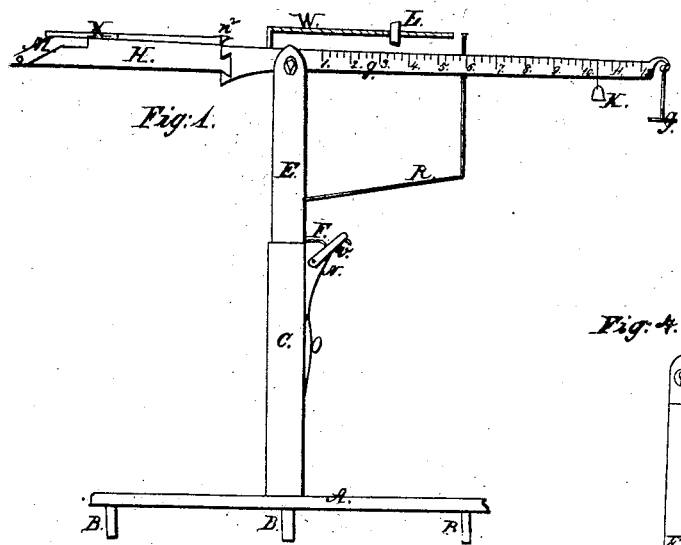
Fig. 1.
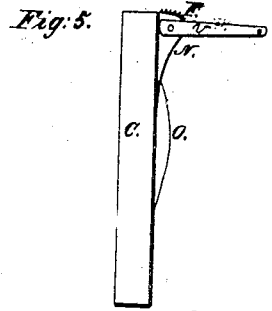
Fig. 5.
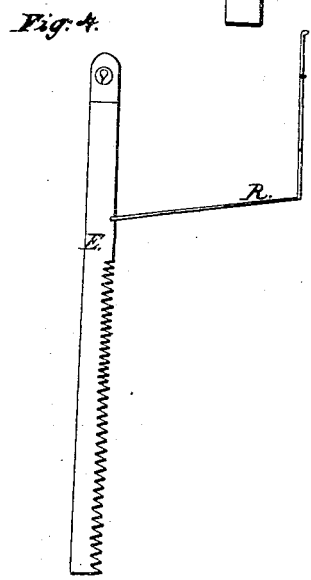
Fig. 4.
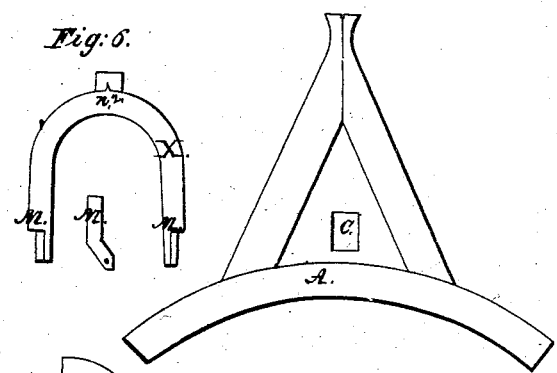
Fig. 2.
Fig. 6.
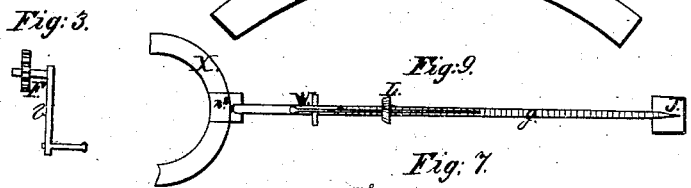
Fig. 3.
Fig. 9.
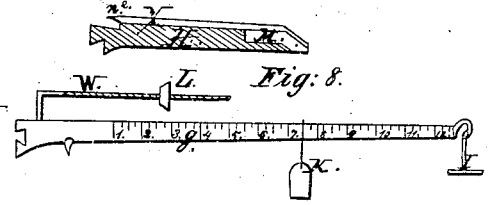
Fig. 7.
Fig. 8.
Witnesses:
S. H. Gwenn
W. H. Wilson
Inventor:
Chas. H. Hunter

UNITED STATES PATENT OFFICE.

CHARLES H. HUNTER, OF SHELBYVILLE, INDIANA.

MACHINE FOR WEIGHING GRAIN.

Specification of Letters Patent No. 25,200, dated August 23, 1859.

*To all whom it may concern:*

Be it known that I, CHARLES H. HUNTER, of Shelbyville, in the county of Shelby and State of Indiana, have invented certain new and useful Improvements in Combined Weighing-Machines and Sack-Holders, which I have described in the following specification and illustrated in the accompanying drawings with significant clearness to enable others of competent skill to make and use my invention.

My invention consists in the arrangement and combination of parts hereinafter described by which the mouth of the sack is stretched open while the grain is put in, and weighed by the scale to which the sack holder is attached as herein more fully set forth.

In the accompanying drawings, Figure 1, is a perspective view of the principal part, showing the operation of my invention. The platform Fig. 2 is a top view of a horizontal section. Figs. 4 and 5 are vertical sections. Figs. 3, 6, 7, 8 and 9 are views of different parts horizontal sections.

I construct platform A, as shown at Fig. 2, so as to rest upon three feet B, B, B. In the center of platform A, I fasten a hollow post C, so that bar E, may slide up and down into part C, by operating cog wheel F, as shown at Figs. 1 and 3. I pass lever $g$, with the scale marked on it through the top of bar E, the fulcrum of lever $g$ resting through the sides of bar E as shown at Fig. 1. On the opposite end of lever $g$, from the scale marks, I dovetail holder H, so that it may be taken off and put on at pleasure. On the end of lever $g$, I attach balancing plate I, and pea K, slides so as to weigh any desired number of pounds. To the top of lever $g$, I firmly fasten an arm W, with a screw cut thereon so as to screw a weight, L, back and forth so as to balance the bag or sack when empty.

The sack holder H, is in the form of a half circle as shown more fully at Fig. 6, and on the top a rim $x$ extending its whole length and projecting as may be desired. In the center of the rim $x$, I project a small point $n^2$ to which I fasten the sack; and at each end of the holder, I fasten clamps M, M, so as to hold the sack between M, M, and rim $x$.

Fig. 4 is a vertical section and showing the side, and the cogs in bar E, also the shape of the fulcrum of lever $g$, at or near the top.

Fig. 6 shows more fully holder H, with its attachments it being a top view.

Fig. 7 is a side view of holder H, showing the manner of attaching clamps M, M.

Fig. 8, is a side view of lever $g$, separate, with fulcrum represented, also pea K, and plate I.

Fig. 9 is a top view of lever $g$, showing the place of attaching holder H.

N, N, are two plates between which I hang cog wheel F, so as to raise and lower bar E, by turning crank $v$.

O is a click to catch in the cogs of bar E, and hold it up as it may be raised by cogwheel F.

R is an arm to keep lever $g$ in its place.

The operation is as follows: Take hold of crank $v$, and by turning raise bar E, a sufficient height so that the end of the sack may not reach the floor. Then fasten the sack on by putting one side over the point in the center of the holder H, then lap the sack over the rim $x$, clear from end to end, then raise clamps M, M, tight against rim $x$, and the more weight the tighter it holds and when sufficiently filled, let it down by turning crank $v$, and clamps M, M, fall down loose as desired.

Having thus fully described my invention I do not claim scale beam or lever $g$, and bag holder H, or either of them as any part of my invention.

What I do claim, is—

The combination of the scale beam or lever $g$, with bag holder H, secured to one end, and the standard C, E, with rack and pinion for elevating or depressing the scale beam, when the whole is constructed and arranged substantially as described, for the purposes set forth.

CHAS. HELY HUNTER.

Witnesses:
S. H. YOCUM,
JOEL KLINE.